(12) United States Patent
Hwang

(10) Patent No.: US 7,980,287 B2
(45) Date of Patent: Jul. 19, 2011

(54) ADHESIVE CHUCK AND SUBSTRATE BONDING APPARATUS

(75) Inventor: Jae Seok Hwang, Seongnam-si (KR)

(73) Assignee: ADP Engineering Co., Ltd., Seongnam-Si (KR)

( * ) Notice: Subject to any disclaimer, the term of this patent is extended or adjusted under 35 U.S.C. 154(b) by 488 days.

(21) Appl. No.: 12/132,100

(22) Filed: Jun. 3, 2008

(65) Prior Publication Data

US 2009/0065152 A1   Mar. 12, 2009

(51) Int. Cl.
*B29C 65/48* (2006.01)
*B32B 37/26* (2006.01)
*B32B 38/18* (2006.01)

(52) U.S. Cl. ........ 156/538; 156/539; 156/556; 156/580; 156/750

(58) Field of Classification Search ............ 56/247, 56/249, 289, 306.3, 323, 344, 391, 537–540, 56/556, 557, 564, 565, 580, 584; 156/247, 156/249, 289, 306.3, 323, 344, 391, 537–540, 156/556, 557, 564, 565, 580, 584, 750
See application file for complete search history.

(56) References Cited

U.S. PATENT DOCUMENTS
5,980,663 A * 11/1999 Badehi .......................... 156/64

FOREIGN PATENT DOCUMENTS
JP   2006276669 A * 10/2006

OTHER PUBLICATIONS

English Abstract of JP 2006-276669A.*
Machine Translation of JP 2006-276669A.*

* cited by examiner

Primary Examiner — Philip C Tucker
Assistant Examiner — Sing P Chan
(74) Attorney, Agent, or Firm — KED & Associates LLP

(57) ABSTRACT

A substrate bonding apparatus includes a first chamber including a first surface plate on which a first substrate is supported, a second chamber spaced from the first chamber and including a second surface plate on which a second substrate to be bonded to the first substrate is supported, an adhesive module provided on the first surface plate and including a plurality of adhesive rubber areas holding the first substrate, and a lift module for lifting at least one of the plurality of adhesive rubber areas.

22 Claims, 11 Drawing Sheets

ADHESIVE CHUCK AND SUBSTRATE BONDING APPARATUS

BACKGROUND

1. Field

One or more embodiments described herein relate to the use of adhesive chucks in substrate bonding.

2. Background

A liquid crystal display (LCD) may be formed by injecting liquid crystal between a thin film transistor (TFT) substrate and a color filter (CF) substrate coated with a fluorescent material. A sealer may be applied to the circumferential surfaces of the substrates to prevent leaking. Prior to sealing, spacers may be positioned between the substrates to maintain a gap between them. However, problems have arisen during the process of bonding the substrates, which problems make the LCD expensive to manufacture or unreliable in terms of its operation

DETAILED DESCRIPTION

A liquid crystal display (LCD) may be formed by bonding TFT and CF substrates together. A liquid crystal material is then injected between the substrates. This bonding process is one of the most important processes that determine the quality of the LCD, and is generally performed by an apparatus having chambers in a vacuum.

One type of bonding apparatus includes two electrostatic chucks (ESC) disposed opposite to each other in the chambers for holding respective ones of the substrates. The apparatus operates by bringing the electrostatic chucks close to each other while parallelism of the chucks is precisely maintained. The bonding process is performed when the chucks are in these positions.

The electrostatic chucks used to support the substrates are fabricated to include a metal pattern on a polyimide film. Using chucks of this type increases costs. Moreover, the polyimide film coated on the surface of each chuck may become damaged by particles generated during the substrate bonding process. This causes a less than optimal LCD to be fabricated.

Figure 1:
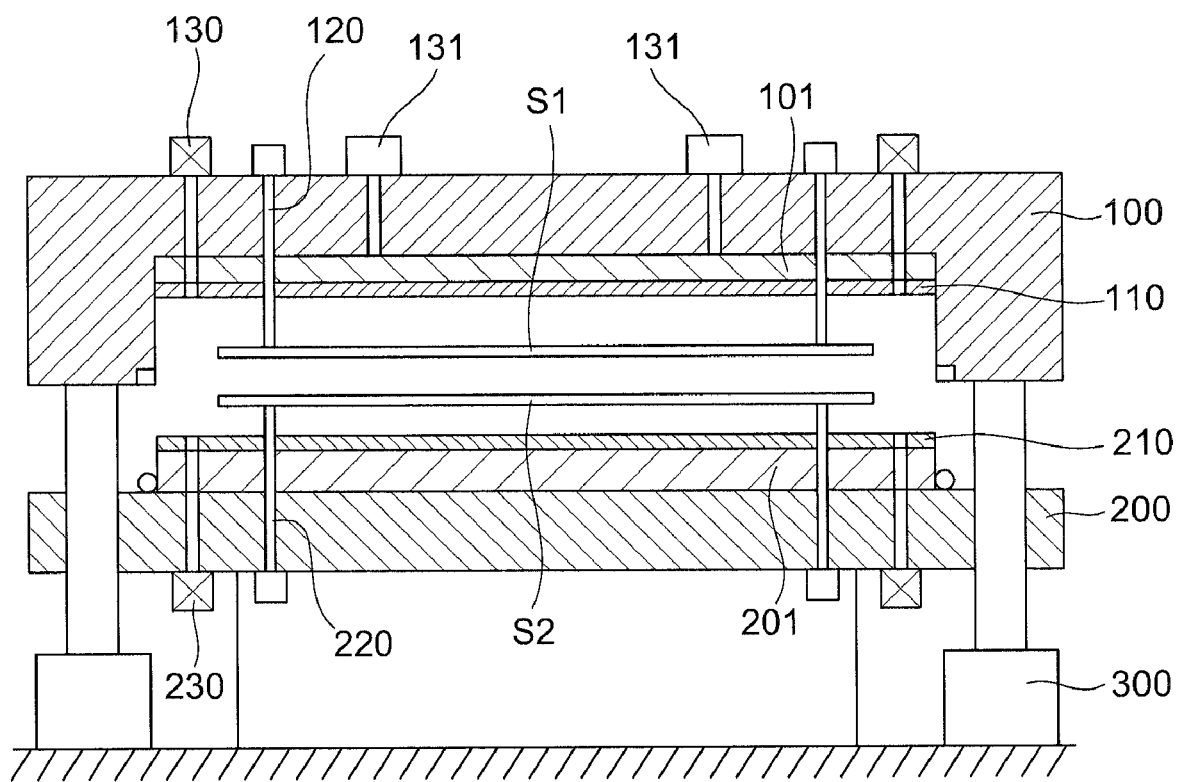
FIG. 1 is a diagram showing one embodiment of a substrate bonding apparatus.

FIG. 1 shows one embodiment of a substrate bonding apparatus which overcomes one or more of these drawbacks. This apparatus includes a first chamber 100 and a second chamber 200. The first chamber is supported and moved up and down by a lift 300. The second chamber is fixed beneath the first chamber.

The first chamber 100 includes an adhesive chuck 110 supporting a first substrate S1, and the second chamber includes a substrate chuck 210 supporting a second substrate S2. The adhesive chuck 110 is provided on a first surface plate 101 of the first chamber, and a substrate chuck 210 is provided on a second surface plate 201 of the second chamber. The substrate chuck 210 may be an electrostatic chuck (ESC) holding the second substrate S2 by electrostatic force.

The first chamber also includes a plurality of vacuum chucks 120 that pass through the first surface plate 101 and which move up and down. The vacuum chucks 120 are lowered to the bottom of adhesive chuck 110 when the first substrate S1 is carried into the first chamber. The vacuum chucks hold and support the first substrate by a vacuum when guiding the first substrate S1 to the adhesive chuck 110.

The second chamber 200 includes a plurality of lift pins 220 that pass through the second surface plate 201 and which move up and down. The lift pins are lifted to the top of substrate chuck 210 when the second substrate S2 is carried in the second chamber. The lift pins are lifted to the top of the substrate chuck after completion of the bonding process, to separate the bonded panel from the substrate chuck 210.

A camera 130 is provided at the top of the first chamber 100. The camera photographs alignment marks on the first substrate S1 and second substrate S2, and a lighting unit 230 is provided at the bottom of the second chamber 200 to provide light to the camera. The camera and lighting unit cooperate to determine whether the first substrate S1 and the second substrate S2 are located at accurate positions.

The first and second chambers are brought close to each other to form an airtight process space. A turbo molecular pump (TMP) or a dry pump may be used to create a vacuum in the process space. Meanwhile, the adhesive chuck 110 may hold the first substrate S1 by adhesive force.

Figure 2:
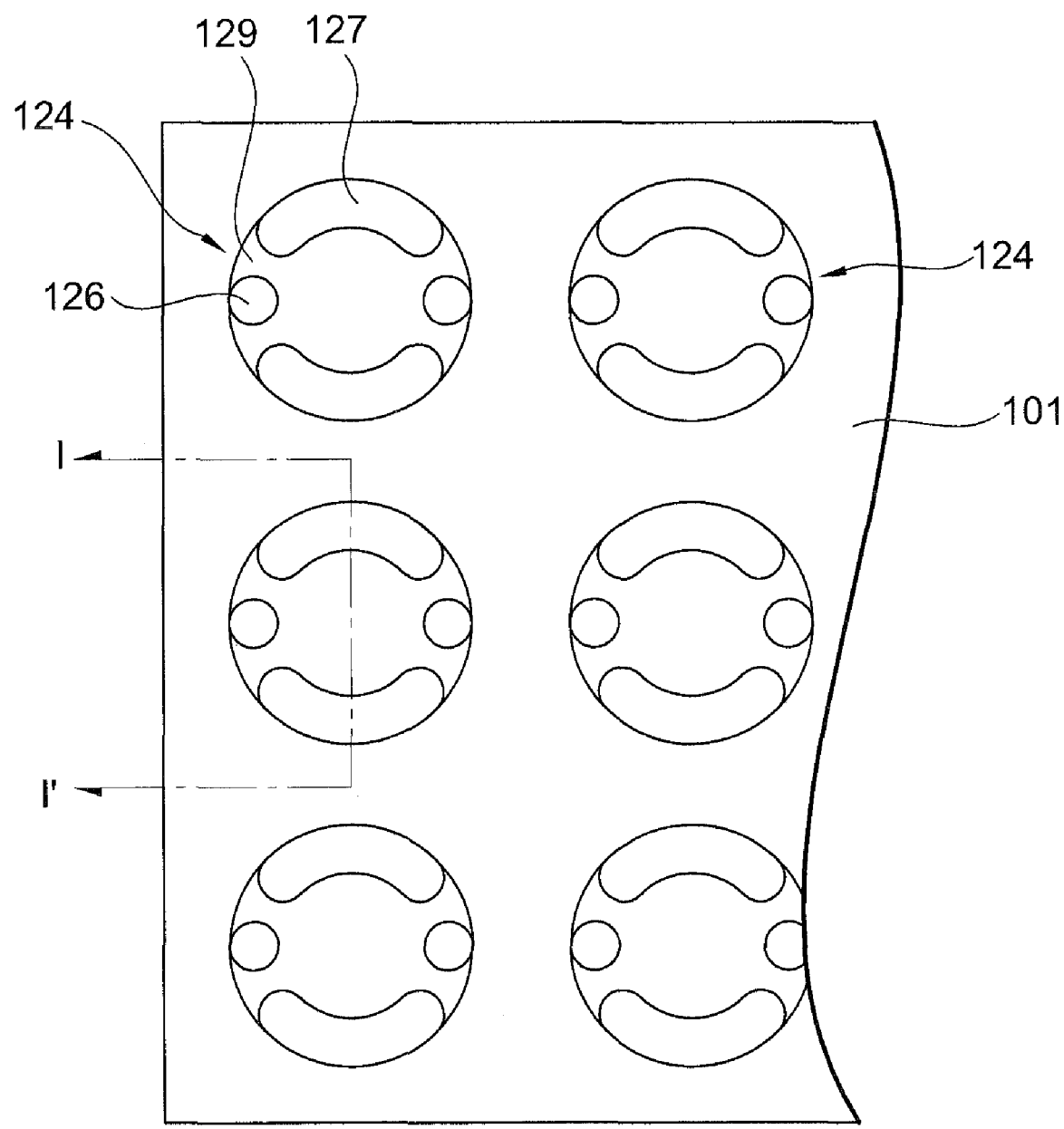
FIG. 2 is a diagram showing a plan view of an adhesive module in the substrate bonding apparatus of FIG. 1.
Figure 3:
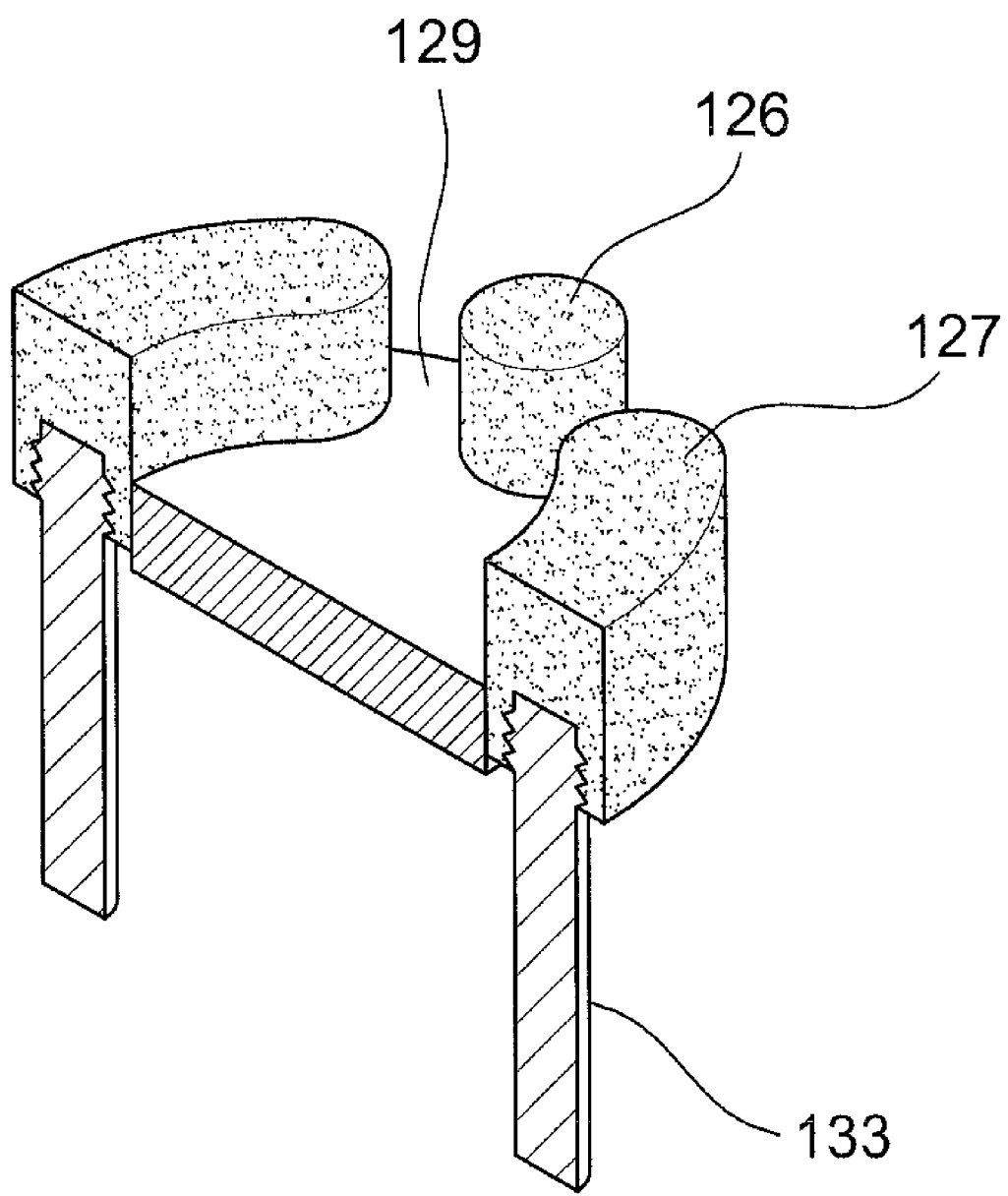
FIG. 3 is a diagram showing a cross-sectional view taken along line I-I' in FIG. 2.
Figure 4A:
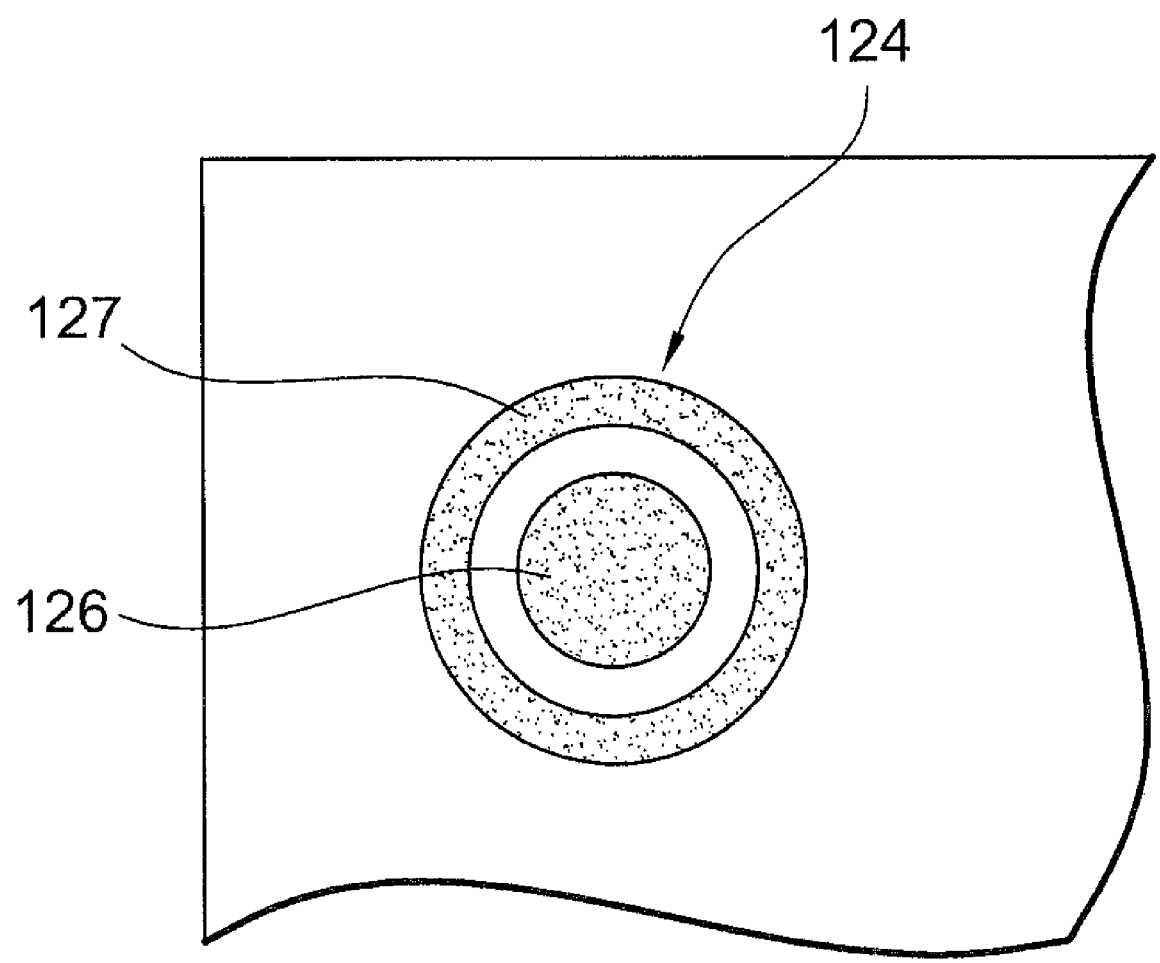
FIGS. 4A-4D are diagrams showing adhesive chucks that may be used to form a substrate bonding apparatus such as shown in FIG. 1 or in other embodiments described herein.
Figure 4B:
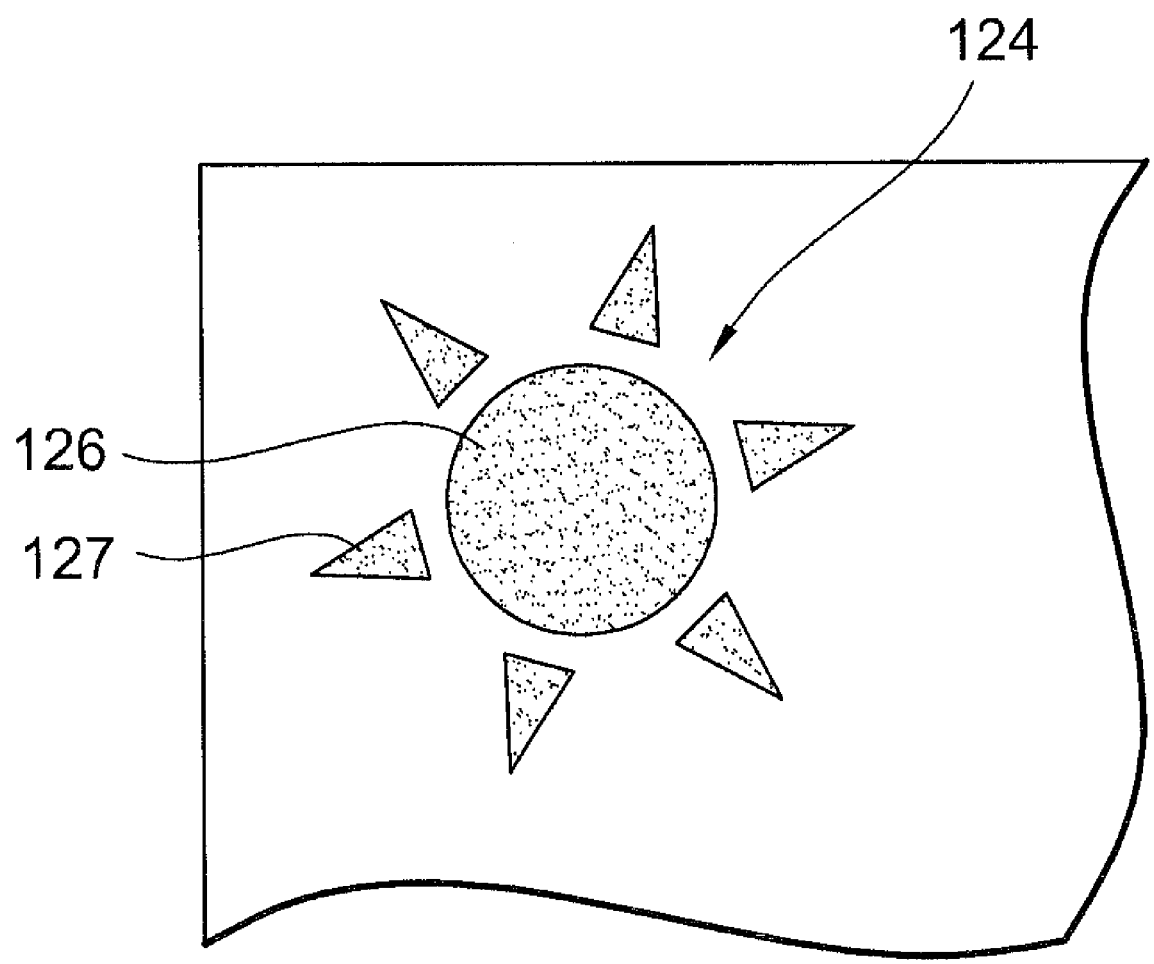
Figure 4C:
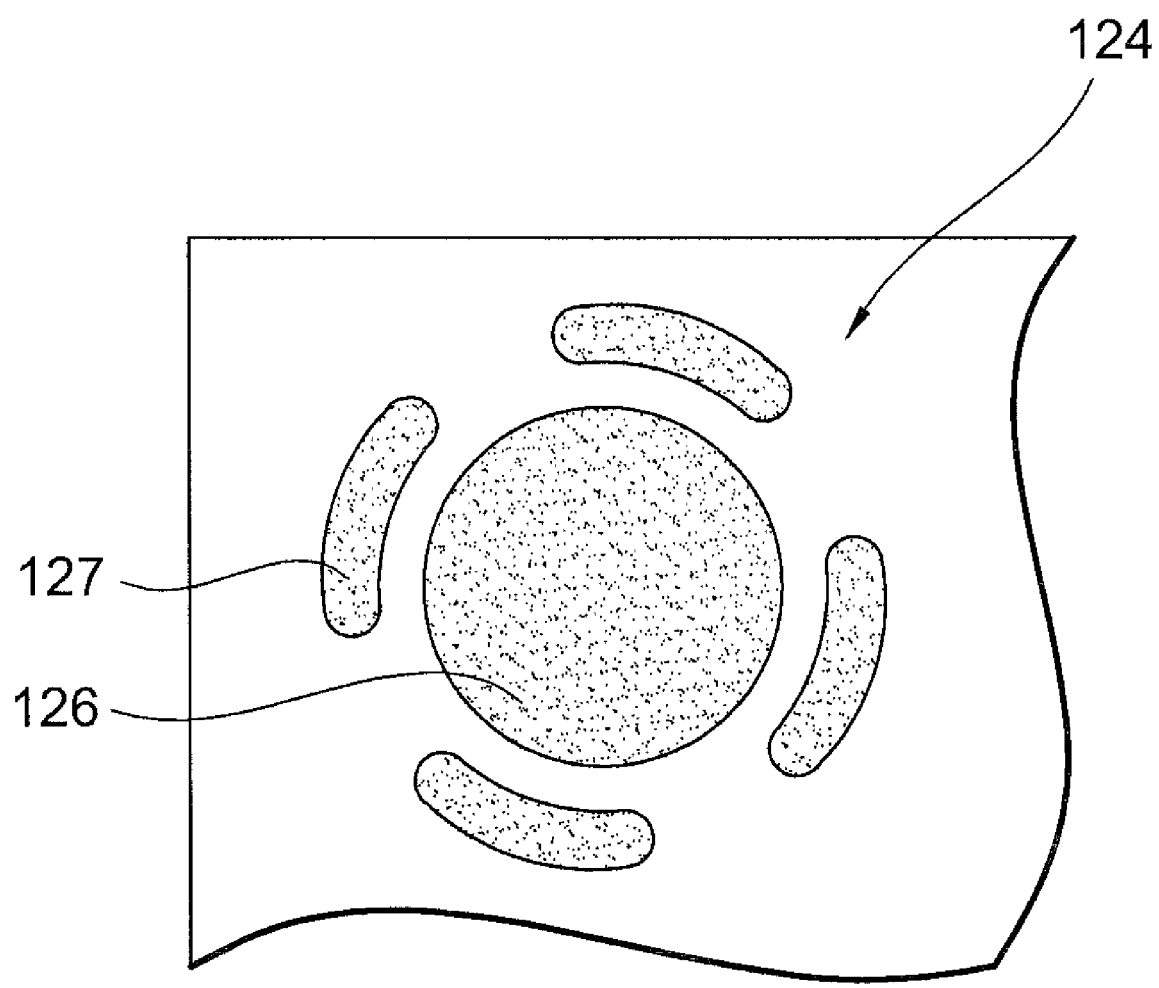
Figure 4D:
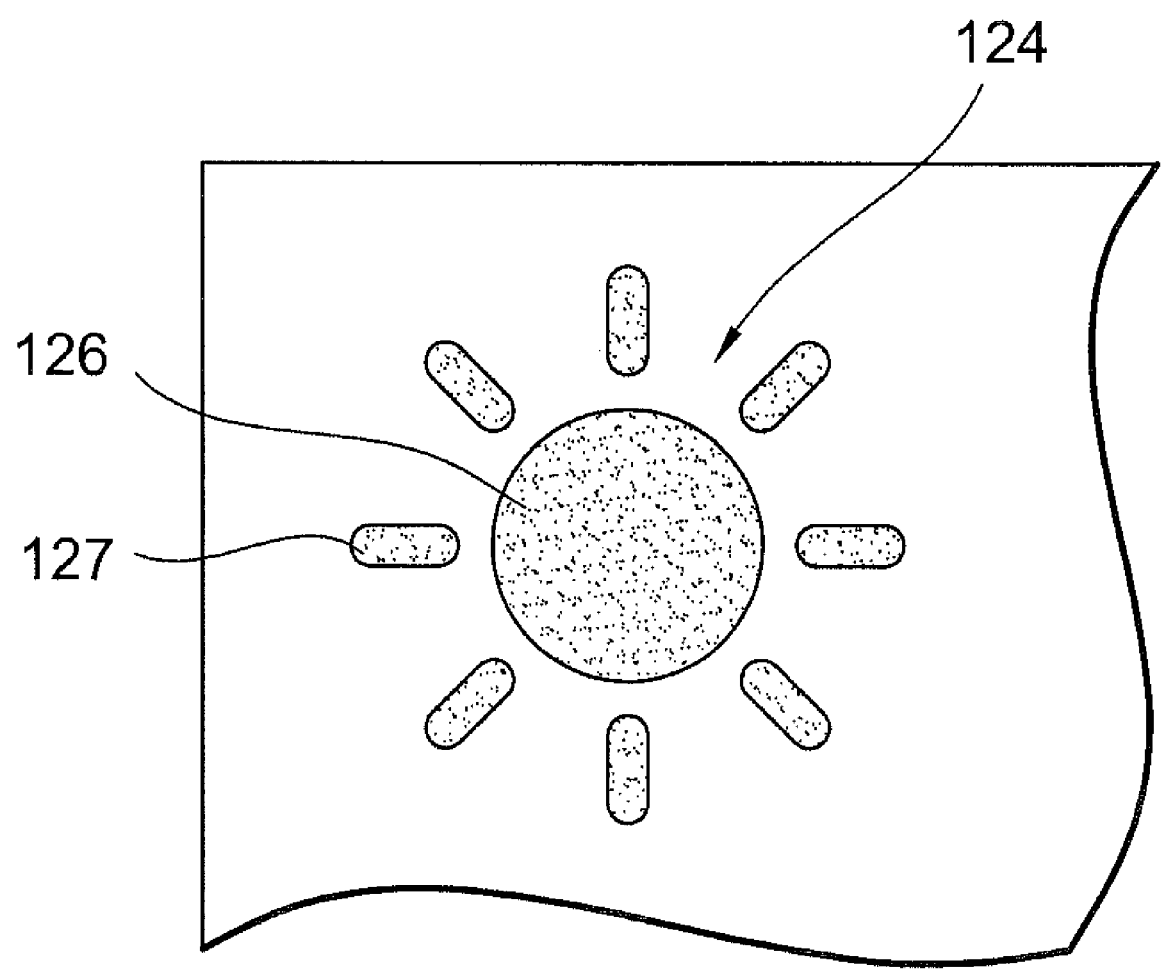

FIG. 2 shows a plan view of an adhesive module in the substrate bonding apparatus of FIG. 1, and FIG. 3 shows a cross-sectional perspective view taken along line I-I' of FIG. 2. As shown in FIGS. 2 and 3, adhesive chuck 110 may include a plurality of adhesive modules 124.

The adhesive modules are arranged in the form of a matrix on the first surface plate 101. Arranging the modules in a matrix allows them to independently operate. It also allows the modules to be independently replaced, repaired, and maintained.

Each adhesive module includes a plurality of adhesive rubber areas 126 and 127 and a plate 129. The adhesive rubber areas 126 and 127 may be obtained, for example, by curing 10 to 75 parts by weight of an organopolysiloxane having alkenyl groups bonded to silicon atoms, 5 to 30 parts by weight of an organhydrogenpolysiloxane, and an addition-curable silicone rubber composition comprising an addition-curable catalyst.

The adhesive rubber areas 126 and 127 may be formed by directly forming an external shape through compression molding or injection molding, or in accordance with any one of a variety of other known techniques.

According to one embodiment, the apparatus may use two kinds of adhesive rubber areas. Different kinds, numbers, and/or shapes of the adhesive rubber areas may be used in other embodiments.

The two adhesive rubber areas 126 and 127 may be classified into first adhesive rubber areas 126 and a second adhesive rubber areas 127. The first adhesive rubber areas may be fixed to plate 129, and the second adhesive rubber areas 127 may be installed to be moved up and down with respect to plate 129.

In addition, the second adhesive rubber areas 127 are lifted by lift modules 131 disposed at the top of the first chamber. The second adhesive rubber areas are moved up and down in order to allow the first substrate S1 to be dropped onto the second substrate S2, so that the two substrates may be bonded together.

When the first substrate S1 is carried in (e.g., by a robot), the second adhesive rubber areas 127 hold and support the first substrate S1 so that the surfaces of the second adhesive rubber areas facing the first substrate S1 are parallel with respect to the surfaces of the first adhesive rubber areas 126 facing the first substrate S1.

The second adhesive rubber areas are lifted to drop the first substrate S1 on to the second substrate S2 for bonding the substrates. That is, in a state where the first substrate S1 is close to the second substrate S2, the second adhesive rubber areas 127 are lifted by lift modules 131. The first substrate S1 is then separated from the second adhesive rubber areas. Since the first substrate is held and supported only by first adhesive rubber areas 126, the adhesive force is gradually reduced and thus the first substrate S1 is separated from the first adhesive rubber areas and dropped onto the second substrate S2 for bonding thereto. It is preferable that each of the second adhesive rubber areas has a contact area with respect to the first substrate S1 greater than that of the first adhesive rubber areas. The sizes of these areas may be different in other embodiments.

The first adhesive rubber areas 126 or the second adhesive rubber areas 127 may have a curved circumference or may have a polygonal circumference. In other embodiments, the first adhesive rubber areas may have a polygonal circumference and the second adhesive rubber areas may have a curved circumference, or vice versa.

FIGS. 4A-4D show examples of adhesive chucks that may be used with one or more of the foregoing embodiments. During bonding, each lift module 131 passes through plate 129 to move up and down a lift bar 133 connected to the second adhesive rubber areas 127. A single lift module 131 may be used to move the second adhesive rubber areas 127 up and down, or a plurality of lift modules 131 may used to independently move the second adhesive rubber areas 127 up and down with respect to a certain portion of the first substrate S1.

Operation of a substrate bonding apparatus according to one or more of the foregoing embodiments will now be described with reference to FIGS. 5A to 5D.

Figure 5A:
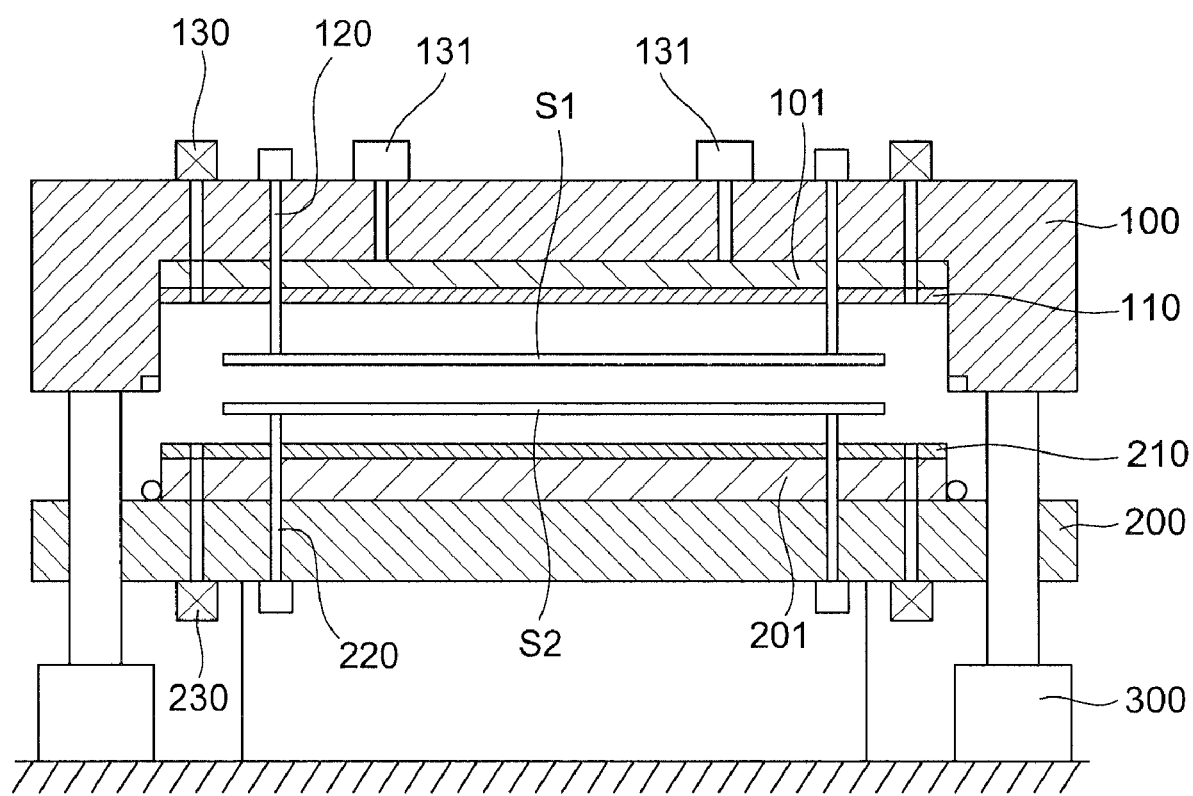
FIGS. 5A-5D are diagrams showing operations that may be performed by one or more embodiments of the substrate bonding apparatuses described herein.

As shown in FIG. 5A, in a state where the first chamber 100 and the second chamber 200 are spaced from each other, the first substrate S1 and the second substrate S2 are carried to positions between the first and second chambers, e.g., by a robot. The first substrate S1 is supported by the lowered vacuum chucks 120 and lifted. The first substrate S1 is held by the first adhesive rubber areas 126 and the second adhesive rubber areas 127. The second substrate is supported by the lift pins 220 and lowered. The second substrate is received on the second surface plate 201 and held by the substrate chuck 210 by electrostatic force.

The first and second substrates may be simultaneously carried to positions between the first and second chambers supported by vacuum chucks 120 and lift pins 220, respectively. In other embodiments, one of the first substrate S1 or the second substrate S2 may be carried first between the first chamber and second chamber and supported by a respective one of the surface plates, and then the other substrate may be carried between the first and second chambers and supported by the other surface plate.

After these steps, the first chamber is lowered by the lift 300 to a position close to the second chamber 200, thereby forming a process space. A vacuum is then created in the process space, for example, by a dry pump or turbo molecular pump. At this time, the first surface plate 101 is lowered to perform a rough alignment between the first and second substrates. The rough alignment may be performed, for example, by photographing the alignment marks by the camera in such a state that the distance between the two substrates is enlarged. The alignment may then be performed by a UVW alignment apparatus (not shown) that is installed at the bottom portion of a surface plate. However, the alignment marks may not be matched exactly because the distance between the substrates is enlarged.

Figure 5B:
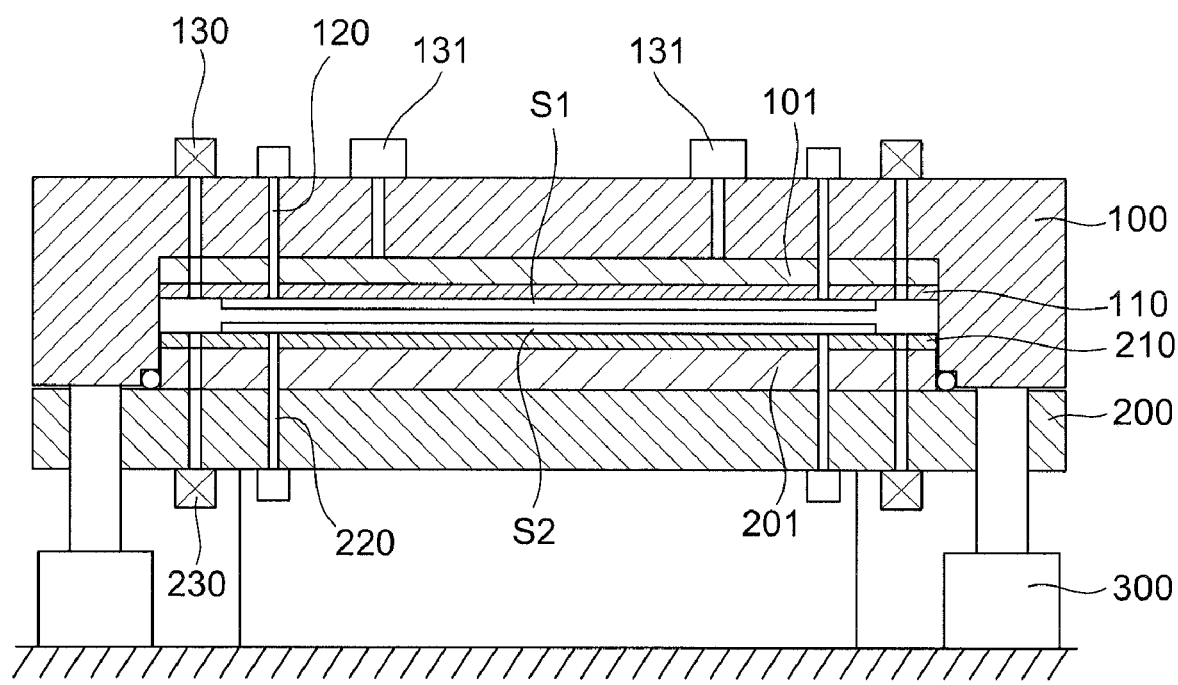

After completion of the rough alignment, a precise alignment between these substrates to complete the alignment process as shown in FIG. 5B. This may be accomplished, for example, by aligning the UVW stage where the substrates are arranged close to each other. At this time, the alignment marks may be more precisely matched because the distance between the substrates is arranged close to each other. This alignment method or other known alignment methods may be used in the bonding apparatus.

Figure 5C:
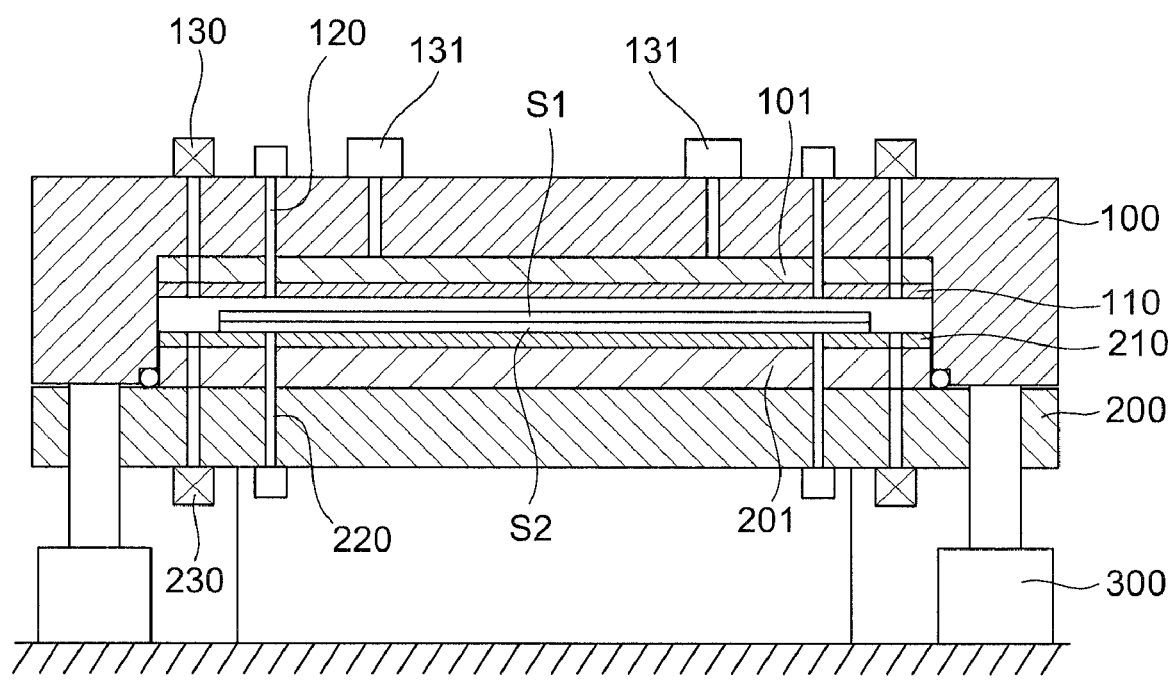

After these steps, the first substrate S1 and second substrate S2 are close to each other. In this state, lift modules 131 lift the second adhesive rubber areas 127. As the second adhesive rubber areas are lifted, the adhesive force applied to the first substrate S1 by the second adhesive rubber areas is interrupted. Since the first substrate S1 cannot maintain the adhesive state only by the first adhesive rubber areas 126, the first substrate S1 is dropped onto the second substrate S2 and bonded thereto as shown in FIG. 5C.

Bonding between the substrates may be aided by coating at least one of the substrates with an adhesive agent in advance. This agent may cause the substrates to adhere to one another after a curing process is performed using, for example, UV light. Alternatively, a heat curing technique may be used for increasing the strength of the bond between the substrates. These or other known bonding techniques may be used during processing.

Figure 5D:
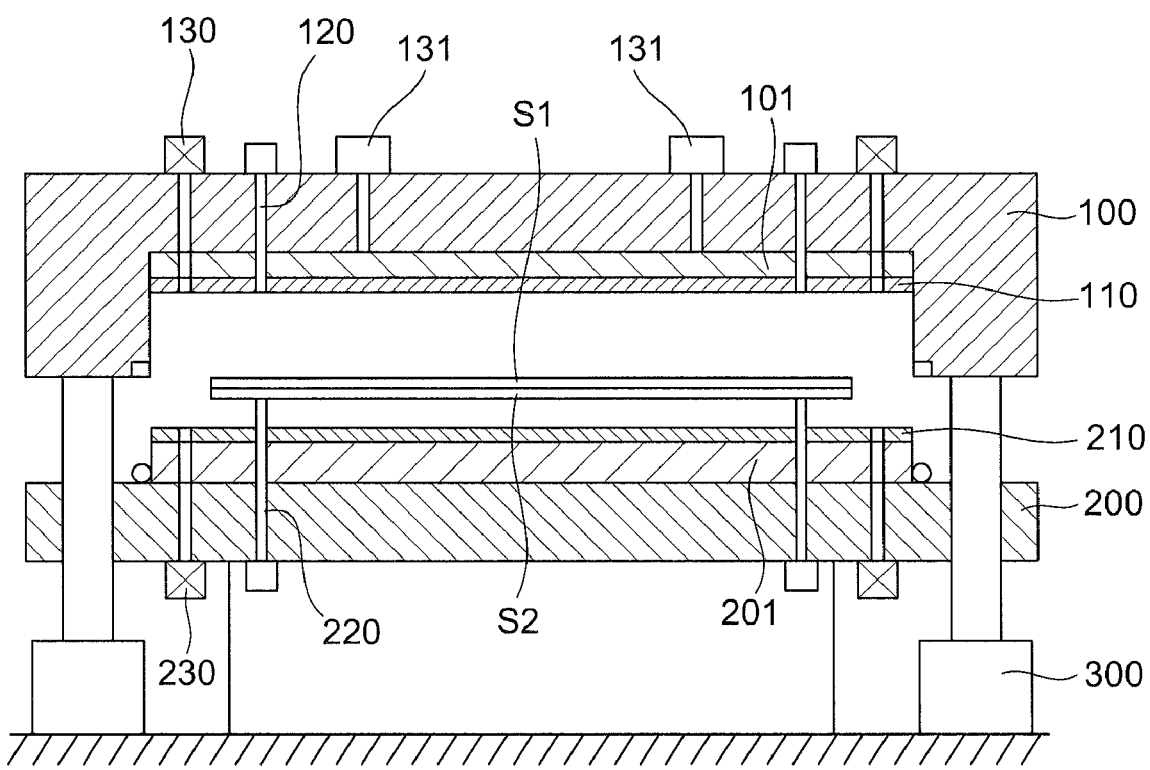

Air may be discharged from the process space to create an atmospheric pressure state. Nitrogen (N2) gas may be supplied from the first chamber 100 so that the first substrate S1 and the second substrate S2 are more firmly bonded to each other during the boding process. Then, the first chamber may be lifted to be spaced from the second chamber. The lift pins 220 are then moved upwardly in order to separate the bonded panel from the second surface plate 201 as shown in FIG. 5D. Then, a robot may enter the process space and remove bonded panel, thus completing the bonding process.

The adhesive chuck 110 may be included in the above-described substrate bonding apparatus or may be used as an independent unit.

In accordance with one or more of the foregoing embodiments, a substrate bonding apparatus may be provided to support substrates by adhesive force, facilitate maintenance and repair, and low facility investment cost.

In accordance with one embodiment, a substrate bonding apparatus comprises a first chamber including a first surface plate on which a first substrate is supported; a second chamber spaced from the first chamber and including a second surface plate on which a second substrate to be bonded to the first substrate is supported; an adhesive module provided on the first surface plate and including a plurality of adhesive rubbers holding the first substrate; and a lift module for lifting at least one of the plurality of adhesive rubbers. The adhesive module may include a plate, a first adhesive rubber fixed to the plate, and a second adhesive rubber connected to the plate to be moved up and down by the lift module.

In accordance with another embodiment, an adhesive chuck comprises an adhesive module including a plurality of adhesive rubbers; and a lift module for lifting at least one of the plurality of adhesive rubbers. The adhesive module may includes a plate, a first adhesive rubber fixed to the plate, and a second adhesive rubber connected to the plate to be moved up and down by the lift module.

The foregoing embodiments of the substrate bonding apparatus therefore have at least the following advantages. Since the substrate is supported by adhesive rubber areas, it is possible to reduce facility investment costs, which leads to a reduction in the overall manufacturing cost. Moreover, since the adhesive chuck has a simple structure which includes adhesive rubber areas, easier and more convenient maintenance and repair are facilitated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A substrate bonding apparatus comprising:
a first chamber, including a first surface plate, to hold a first substrate;
a second chamber spaced from the first chamber and including a second surface plate on which a second substrate to be bonded to the first substrate is supported;
at least one adhesive module coupled to the first surface plate and including at least one first adhesive area and at least one second adhesive area holding the first substrate; and
a lifter to lift the at least one second adhesive area,
wherein the at least one first adhesive area is fixed to a third plate and the at least one second adhesive area is movably coupled to the lifter, and wherein the lifter moves the at least one second adhesive area relative to the third plate and the at least one first adhesive area to cause the first substrate to be held within and released relative to the first chamber.

2. The apparatus of claim 1, wherein the at least one second adhesive area has a contact area with respect to the first substrate greater than a contact area of the at least one first adhesive area.

3. The apparatus of claim 1, wherein the at least one second adhesive area is arranged in a substantially circular shape and formed around the at least one first adhesive area.

4. The apparatus of claim 1, wherein the adhesive module comprises a plurality of second adhesive areas movably coupled to the third plate and formed around the at least one first adhesive area.

5. The apparatus of claim 4, wherein each of the second adhesive area is substantially triangular in shape.

6. The apparatus of claim 4, wherein each of the second adhesive areas has a substantially oval shape.

7. The apparatus of claim 6, wherein the substantially oval shape is a curved oval shape.

8. The apparatus of claim 1, wherein the at least one first adhesive area and the at least one second adhesive area are made from a same material.

9. The apparatus of claim 8, wherein the same material is rubber.

10. The apparatus of claim 1, further comprising:
a plurality of adhesive modules independently coupled to different areas of the first surface plate in a predetermined pattern, wherein each adhesive module includes substantially a same arrangement of the at least one first adhesive area and the at least one second adhesive area.

11. The apparatus of claim 10, wherein the lifter is to simultaneously lift the second adhesive areas of the plurality of adhesive modules relative to respective ones of the first adhesive areas which are fixed to respective ones of the third plates.

12. The apparatus of claim 10, wherein each of the plurality of adhesive modules are independently coupled to the first surface plate, to allow each of the adhesive modules to be replaced or repaired independently from other ones of the adhesive modules.

13. An adhesive chuck comprising:
at least one adhesive module including at least one first adhesive area and at least one second adhesive area; and
a lifter to lift the at least one second adhesive area,
wherein the at least one first adhesive area is fixed to a plate and the at least one second adhesive area is movably coupled to the lifter, and wherein the lifter moves the at least one second adhesive area relative to the plate and the at least one first adhesive area to cause a substrate to be held and released by the adhesive module.

14. The adhesive chuck of claim 13, wherein the at least one second adhesive area has a contact area with respect to the substrate greater than that of the at least one first adhesive area.

15. The adhesive chuck of claim 13, wherein at least one of the first adhesive area or the second adhesive area has a curved circumference.

16. The adhesive chuck of claim 13, wherein at least one of the first adhesive area or second adhesive area has a polygonal circumference.

17. The adhesive chuck of claim 13, wherein one of the first adhesive area or the second adhesive area has a polygonal circumference and the other one of the first adhesive area or the second adhesive area has a curved circumference.

18. The adhesive chuck of claim 13, wherein the at least one first adhesive area and the at least one second adhesive area are made from a same material.

19. The adhesive chuck of claim 18, wherein the same material is rubber.

20. The adhesive chuck of claim 13, further comprising:
a plurality of adhesive modules independently coupled to different areas of the plate in a predetermined pattern, wherein each adhesive module includes substantially a same arrangement of the at least one first adhesive area and the at least one second adhesive area.

21. The adhesive chuck of claim 20, wherein the lifter is to simultaneously lift the second adhesive areas of the plurality of adhesive modules relative to respective ones of the first adhesive areas which are fixed to respective ones of the plates.

22. The adhesive chuck of claim 20, wherein each of the plurality of adhesive modules are independently coupled to the plate, to allow each of the adhesive modules to be replaced or repaired independently from other ones of the adhesive modules.

* * * * *